3,013,072
NOVEL PROCESS FOR THE PRODUCTION
OF SULFONYLUREAS
William M. McLamore, Kew Gardens, and Gerald D. Laubach, Jackson Heights, N.Y., assignors to Chas. Pfizer & Co., Inc., New York, N.Y., a corporation of Delaware
No Drawing. Filed Sept. 2, 1958, Ser. No. 758,600
5 Claims. (Cl. 260—553)

This invention relates to a novel method for preparing sulfonylureas and it is particularly concerned with a process for the production of sulfonylureas having the general formula $RSO_2NHCONHR'$, wherein R is aryl and R' is alkyl, alkenyl, cycloalkyl, cycloalkylalkyl or aryl.

In accordance with the prior art, a number of methods have been suggested for preparing sulfonylureas. For instance, in U.S. patent application Ser. No. 660,064, filed on May 20, 1957, there is described a process for preparing arylsulfonylureas from the corresponding arylsulfonamides by contacting the latter compounds with the appropriate organic isocyanate; it should be noted that in some instances the yield of product may range as low as 20%. Furthermore, the use of other classical procedures described in the chemical literature, such as that of F. Kurzer in the Journal of the Chemical Society, 1951, page 1258, is often extremely inconvenient inasmuch as the yields afforded by them are very poor and difficulty is often encountered in the isolation of the desired product. In addition, many of them have the further disadvantage of being non-economical in view of the use of expensive reagents which they entail. Moreover, the isocyanate starting materials employed in these prior art methods are difficult to store and handle in view of their toxicity and volatility, as well as their general instability to such agents as water, alcohols, amines, and the like.

In accordance with the present invention, it has been unexpectedly discovered that an N'-substituted arylsulfonylurea as defined above can be prepared in substantially high yields by treating a monoalkali metal or alkaline earth metal salt of an arylsulfonamide with an aryl N-substituted carbamate or thiolcarbamate in an inert polar organic solvent medium. In particular, this invention affords a new and useful process for the production of a compound having the general formula $$RSO_2NHCONHR'$$

wherein R is an aryl moiety, such as a phenyl, thienyl or pyridyl radical which is either unsubstituted or substituted with such groups as halogen, nitro, amino, acetylamino, lower alkyl and lower alkoxyl, e.g., p-fluorophenyl, p-chlorophenyl, p-bromophenyl, p-nitrophenyl, p-acetylaminophenyl, p-tolyl, p-anisyl, 2,4-dimethylphenyl, 2,5-dimethylphenyl, 3,4-dichlorophenyl or 3-chloro-p-tolyl group, 5-chloro-2-thienyl, 5-bromo-2-thienyl, 5-methyl-2-thienyl, 4-methyl-2-thienyl, 5-t-butyl-2-thienyl, 2,5-dimethyl-3-thienyl, 2,5-dichloro-3-thienyl, 5-chloro-2-methyl-3-thienyl, 6-methyl-2-pyridyl, 4,6-dimethyl-2-pyridyl, 6-amino-3-pyridyl, and the like, and R' is alkyl having from one to ten carbon atoms, alkenyl having from three to eight carbon atoms, cycloalkyl having from three to six carbon atoms and cycloalkylalkyl having from four to nine carbon atoms or it is an aryl moiety as previously defined for R; preferred R' aryl moieties include phenyl, p-chlorophenyl, p-bromophenyl, p-tolyl, p-anisyl, and the like. These compounds are of especial therapeutic value in view of their hypoglycemic activity. Moreover N-(p-chlorobenzenesulfonyl)-N'-n-propylurea and N-(p-toluenesulfonyl)-N'-p-anisylurea are particularly effective in this regard, both compounds being excellent oral antidiabetic agents.

The process of this invention comprises contacting the corresponding sulfonamide in the form of its monoalkali metal or alkaline earth metal salt with an aryl N-substituted carbamate or thiolcarbamate having the general formula $R'NHCOXR''$, as is illustrated in the following equation wherein X is either oxygen or sulfur, R and R' are defined as aforesaid and R'' is defined as hereinafter:

$$RSO_2NH_2 + R'NHCOXR'' \rightarrow RSO_2NHCONHR' + R''XH$$

Inasmuch as the products produced by the process of this invention are known to have utility as medicinal agents for reducing blood sugar levels, a convenient and economic process for their production is of tremendous value to the public in general. The particular advantages offered by the process of this invention are manifold: for instance, the yields of sulfonylurea produced are generally of the order of 85–95% and in some instances the yield is almost quantitative; the reagents, preferably a sulfonamide monoalkali metal or alkaline earth metal salt and the appropriate aryl N-substituted carbamate or thiolcarbamate are relatively cheap and easily prepared; and control of the reaction conditions in this process is neither difficult nor is expensive equipment required.

In accordance with the process of this invention, a monoalkali or alkaline earth metal salt of an arylsulfonamide having the previously defined general formula $RSO_2NH_2$, and preferably the monosodium salt thereof, is reacted in an inert polar organic solvent medium with an aryl N-substituted carbamate or thiolcarbamate having the general formula $R'NHCOXR''$, wherein R'' is an aryl moiety, such as phenyl, p-chlorophenyl, p-bromophenyl, p-nitrophenyl, p-tolyl, p-anisyl, α-naphthyl, β-naphthyl group, and the like, at a temperature in the range of from about 20° C. to about 150° C. for a time period of about one-half to about ten hours, and the desired sulfonylurea is recovered in solid form. The inert polar organic solvent is preferably selected from the class consisting of N,N-lower dialkyl derivatives of lower alkane hydrocarbon carboxamides, lower dialkyl sulfoxides and lower dialkyl sulfones. Preferred N,N-lower dialkyl derivatives of lower alkane hydrocarbon carboxamides include dimethylformamide, diethylformamide, dimethylacetamide, diethylacetamide, and the like; preferred lower dialkyl sulfoxides include dimethyl sulfoxide, diethyl sulfoxide, diisopropyl sulfoxide, di-n-propyl sulfoxide, and the like; while preferred lower dialkyl sulfones include dimethyl sulfone, diethyl sulfone, di-isopropyl sulfone, di-n-propyl sulfone, and the like. It is desirable that the inert polar organic solvent be present in sufficient amount to dissolve both the sulfonamide salt and the aryl N-substituted carbamate or thiolcarbamate starting materials. Recovery of the desired sulfonylurea is most conveniently accomplished, in many instances, by first diluting the reaction solution with water, adjusting the pH of the resulting aqueous solution until it is basic, and then subsequently extracting the basic aqueous solution with a water-immiscible organic solvent in order to remove any excess aryl carbamate or thiolcarbamate that may be present; the desired product of this invention is then conveniently isolated from the basic aqueous layer by the addition thereof to a dilute aqueous solution of an acid present in such amount that precipitation of the sulfonylurea occurs, while the corresponding phenolic or thiophenolic by-products remain in solution.

A specific embodiment of the process of the present invention involves the utilization of a monosodium salt of the sulfonamide in the inert polar organic solvent medium. The amount of the monoalkali metal salt of the sulfonamide employed is such that the molar ratio of sulfonamide to the N-substituted aryl carbamate or thiolcarbamate is preferably in the range of from about 1:1 to about 1:3, although substantially equimolar ratios afford satisfactory results. It should be noted that an excess of the aryl N-substituted carbamate or thiolcarbamate is preferably employed inasmuch as this not only aids in shifting the equilibrium to the product side of the equation, but it is also advantageous in that excess carbamate is easily removed after completion of the reaction as stated above. In connection with the shift in the equilibrium to the product side of the equation, it is to be noted that the formation of the phenolic or thiophenolic (aryl mercaptan) by-product of this reaction is readily enhanced by the overall basic character of the reaction mixture.

Recovery of the desired products of this invention is, as previously mentioned, readily accomplished. For instance, the reaction solution is first diluted with water in an amount that is at least ten times the volume of said reaction mixture and the resulting aqueous solution or layer (which is first separated) is then adjusted to a pH value greater than pH 8.0 by addition of any suitable base, such as an alkali metal or alkaline-earth metal hydroxide, carbonate or bicarbonate; for instance, a dilute aqueous sodium carbonate solution has been found to be most satisfactory for these purposes. Following the pH adjustment, the basic aqueous solution is extracted with a water-immiscible organic solvent, such as a lower alkyl ether or a halogenated lower hydrocarbon in order to remove any excess carbamate starting material; or alternatively, the excess reagent may be removed from the basic aqueous medium by means of filtration if it is an insoluble solid material. Isolation of the desired sulfonylureas from the basic aqueous solution, in which they are soluble due to their somewhat acidic nature, is readily accomplished by the addition of a common acid, such as hydrochloric acid or glacial acetic acid, whereupon precipitation of the product occurs; the corresponding phenolic or aryl mercapto by-products, being more water-soluble, remain in the solution under these conditions. Purification of the product is then easily effected either by means of recrystallization from a non-polar organic solvent, such as benzene, toluene, xylene, and the like, or by means of reprecipitation of said product from a dilute aqueous sodium carbonate solution with a mineral acid, such as hydrochloric acid. The latter procedure would be preferred inasmuch as it can be carried out at room temperature, thereby circumventing any decomposition of the product that might possibly take place at higher temperatures.

The starting materials necessary for the process of this invention are compounds which are either well known in the prior art or else they are commercially available or easily prepared in accordance with standard procedures previously described in the chemical literature. For example, the arylsulfonamides are easily obtained by ammonolysis of the corresponding arylsulfonyl chlorides; the latter compounds are either prepared directly by treatment of the substituted parent aryl compounds with chlorosulfonic acid or they are prepared from the corresponding arylsulfonic acid sodium salts, many of which are commercially available. It should be noted that the alkali metal salts of the aforementioned sulfonamides can be very easily prepared by means of a simple procedure; for instance, by treating the sulfonamide in an anhydrous alkanol solvent medium with at least an equivalent amount of the desired alkali metal alkoxide at room temperature almost quantitative yields of the desired starting material are afforded; the monoalkali metal salts of the sulfonamides so produced are then conveniently isolated from the reaction solution by means of precipitation with a suitable anti-solvent, e.g., any relatively non-polar organic solvent, such as diethyl ether, chloroform, etc. The corresponding alkaline earth metal salts may be similarly prepared.

The other major starting materials required for the process of this invention, viz., the aryl N-substituted carbamates and thiolcarbamates, are either commercially available or they may be readily prepared by employing the Schotten-Baumann technique as is illustrated by the following equation:

$$R'NH_2 + R''XCOCl + OH^- \rightarrow R'NHCOXR'' + H_2O + Cl^-$$

The two reactants stated in the above equation are either commercially available or else they are easily prepared by those skilled in the art from readily available starting materials according to classical organic procedures. For instance, it is well known in the art that chlorocarbonic acid esters are readily prepared by reacting an appropriate alcohol with an equimolar amount of phosgene, whereupon the desired chlorocarbonic acid ester is produced; in like manner, the corresponding chlorothiolcarbonic acid esters are prepared by employing an appropriate mercaptan in place of the alcohol in this reaction.

This invention is further illustrated by the following examples, which are not to be considered as imposing any limitations on the scope thereof.

*Example I*

A solution of 3.21 g. (0.015 mole) of the monosodium salt of p-chlorobenzenesulfonamide and 3.58 g. (0.020 mole) of phenyl N-n-propyl carbamate in 15 ml. of dimethylformamide was heated on a steam bath for three hours. The reaction solution was then cooled to room temperature by means of an ice-bath and diluted with 200 ml. of water. The resulting aqueous solution was then made strongly alkaline by the addition of 10 ml. of 20% aqueous sodium carbonate, whereupon an oil was observed to separate from the solution. The latter was then removed by extracting the mixture with 50 ml. of diethyl ether. The resulting aqueous layer was then successively separated, filtered and slowly poured into a chilled dilute aqueous solution of excess hydrochloric acid with constant agitation being maintained throughout the addition. The precipitated product so obtained was collected by means of filtration, washed well with cold water and subsequently air dried to afford 4.11 g. (99%) of N-(p-chlorobenzenesulfonyl)-N'-n-propylurea, M.P. 128.8° C.; on admixture with an authentic sample of this material, no depression in the melting point could be detected; when the infrared spectrum of this compound was superimposed on that of the authentic sample, no differences could be observed.

This same product was also obtained by reacting 3.21 g. (0.015 mole) of the monosodium salt of p-chlorobenzenesulfonamide and 3.90 g. (0.020 mole) of phenyl N-n-propylthiolcarbamate in 20 ml. of dimethyl sulfoxide in accordance with the above described procedure.

*Example II*

The procedure described in Example I is followed except that other phenyl N-substituted carbamates are used in place of phenyl N-n-propylcarbamate. Thus, when 3.21 g. (0.015 mole) of the monosodium salt of p-chlorobenzenesulfonamide reacts with 3.20 g. (0.020 mole) of phenyl N-methylcarbamate in 15 ml. of dimethylformamide in accordance with the procedure previously described, the product is N-(p-chlorobenzenesulfonyl)-N'-methylurea, M.P. 192.7–193.5° C. In the same manner, when corresponding molar amounts of the monosodium salt of p-chlorobenzenesulfonamide and phenyl N-ethylthiolcarbamate react in the above manner, the product is N-(p-chlorobenzenesulfonyl)-N'-ethylurea, M.P. 147.5–148° C. When the monosodium salt of p-chlorobenzenesulfonamide and phenyl N-n-butylcarbamate react in the above manner, the product is N-(p-chlorobenzenesulfonyl)-N'-n-butylurea, M.P. 116.8–117.4° C. When the monosodium salt of p-chlorobenzenesulfonamide and phenyl N-t-butylthiolcarbamate react in the above manner, the product is N-(p-chlorobenzenesulfonyl)-N'-t-butylurea, M.P. 161.5–162° C. When the monosodium salt of p-chlorobenzenesulfonamide and phenyl N-n-amylcarbamate react in the above manner, the product is N-(p-chlorobenzenesulfonyl)-N'-n-amylurea, M.P. 104.2–104.8° C. When the monosodium salt of p-chlorobenzenesulfonamide and phenyl N-cyclohexylthiolcarbamate react in the above manner, the product is N-(p-chlorobenzenesulfonyl)-N'-cyclohexylurea, M.P. 161–161.5° C. When the monosodium salt of p-chlorobenzenesulfonamide and phenyl N-phenylcarbamate react in this manner, the product is N-(p-chlorobenzenesulfonyl)-N'-phenylurea; M.P. 179.5–180.4° C. Similarly, when phenyl N-p-chlorophenylthiolcarbamate is used in place of phenyl N'-phenylcarbamate in this same procedure, the product is N-(p-chlorobenzenesulfonyl)-N'-p-chlorophenylurea, M.P. 182.5–183.2° C. In the same manner, the monosodium salt of p-chlorobenzenesulfonamide and phenyl N-p-tolylcarbamate react to afford N-(p-chlorobenzenesulfonyl)-N'-p-tolylurea, M.P. 176–177° C.; and the monosodium salt of p-chlorobenzenesulfonamide and phenyl N-p-anisylthiolcarbamate react to afford N-(p-chlorobenzenesulfonyl)-N' - p - anisylurea, M.P. 172–173° C.

Example III

The procedure described in Example I is followed except that the starting material employed is the monosodium salt of p-fluorobenzenesulfonamide. Thus, when 2.95 g. (0.015 mole) of this compound reacts with 3.58 g. (0.020 mole) of phenyl N-n-propylcarbamate in 15 ml. of dimethylformamide, the product is N-(p-fluorobenzenesulfonyl)-N'-n-propylurea, M.P. 133–134° C. In the same manner, corresponding molar amounts of the monosodium salt of p-fluorobenzenesulfonamide and phenyl N-n-butylcarbamate react to afford N-(p-fluorobenzenesulfonyl)-N'-n-butylurea, M.P. 102.5–103.3° C.

Example IV

The procedure described in the previous example is followed except that the monosodium salt of p-toluenesulfonamide is the starting material employed. Thus, when 2.90 g. (0.015 mole) of this compound reacts with 3.58 g. (0.020 mole) of phenyl N-n-propylcarbamate in 15 ml. of dimethylformamide in accordance with the procedure of Example I, the product is N-(p-toluenesulfonyl)-N'-n-propylurea, M.P. 152–153° C. In the same manner, when corresponding molar amounts of the monosodium salt of p-toluenesulfonamide and phenyl N-t-butylcarbamate react in this same manner, the product is N-(p-toluenesulfonyl)-N'-t-butylurea; M.P. 164–165° C. When the monosodium salt of p-toluenesulfonamide and phenyl N-cyclohexylthiolcarbamate react in the above manner, the product is N-(p-toluenesulfonyl)-N'-cyclohexylurea, M.P. 174–174.7° C.; and when N-p-anisylcarbamate reacts with this same reagent, the product is N-(p-toluenesulfonyl)-N'-p-anisylurea, M.P. 158.5–159.5° C.

Example V

When 2.70 g. (0.015 mole) of the monosodium salt of benzenesulfonamide and 3.55 g. (0.020 mole) of phenyl N-allylcarbamate react in accordance with the procedure described in Example I, the product is N-benzenesulfonyl-N'-allylurea. In the same manner, corresponding molar amounts of the monosodium salt of p-chlorobenzenesulfonamide and phenyl N-2-pentenylcarbamate react to afford N-(p-chlorobenzenesulfonyl)-N'-2-pentenylurea; the monosodium salt of p-bromobenzenesulfonamide and phenyl N-2-octenylcarbamate react to afford N-(p-bromobenzenesulfonyl)-N'-2-octenylurea; the monosodium salt of p-toluenesulfonamide and phenyl N-cyclopropylcarbamate react to afford N-(p-toluenesulfonyl)-N'-cyclopropylurea; the monosodium salt of p-methoxybenzenesulfonamide and phenyl N-cyclopropylmethylcarbamate react to afford N-(p-methoxybenzenesulfonyl)-N'-cyclopropylmethylurea; the monosodium salt of p-acetylaminobenzenesulfonamide and phenyl N-cyclopentylethylcarbamate react to afford N-(p-acetylaminobenzenesulfonyl)-N'-cyclopentylethylurea; and the monosodium salt of p-toluenesulfonamide and phenyl N-cyclohexylpropylcarbamate react to afford N-(p-toluenesulfonyl)-N'cyclohexylpropylurea.

Example VI

When 3.21 g. (0.015 mole) of the monosodium salt of p-chlorobenzenesulfonamide and 4.70 g. (0.020 mole) of phenyl N-n-heptylcarbamate react in accordance with the procedure described in Example I, the product is N-(p-chlorobenzenesulfonyl)-N'-n-heptylurea. In the same manner, corresponding molar amounts of the monosodium salt of benzenesulfonamide and phenyl N-p-chlorophenylthiolcarbamate react to afford N-benzenesulfonyl-N'-p-chlorophenylurea; the monosodium salt of p-bromobenzenesulfonamide and phenyl N-n-decylcarbamate react to afford N-(p-bromobenzenesulfonyl)-N'n-decylurea; the monosodium salt of p-toluenesulfonamide and phenyl N-p-bromophenylcarbamate react to afford N-(p-toluenesulfonyl)-N'-p-bromophenylurea; the monosodium salt of p-nitrobenzenesulfonamide and phenyl N-n-hexylthiolcarbamate react to afford N-(p-nitrobenzenesulfonyl)-N'-n-hexylurea; and the monosodium salt of p-methoxybenzenesulfonamide and phenyl N-n-octylurea react to afford N-(p-methoxybenzenesulfonyl)-N'-n-octylurea.

Example VII

The procedure described in Example I is followed except for the fact that other aryl N-substituted carbamates are used in place of the corresponding phenyl N-substituted carbamates. For instance, when p-chlorophenyl N-n-propylcarbamate reacts with the monosodium salt of p-chlorobenzenesulfonamide, the product obtained is the same as that described in Example I, viz., N-(p-chlorobenzenesulfonyl)-N'-n-propylurea. In the same manner, p-tolyl N-n-propylthiolcarbamate, p-anisyl N-n-propylcarbamate, α-naphthyl N-n-propylthiolcarbamate and β-naphthyl N-n-propylcarbamate all react with the monosodium salt of p-chlorobenzenesulfonamide to form the same product.

Example VIII

When 3.10 g. (0.015 mole) of the monosodium salt of 2,4-dimethylbenzenesulfonamide and 3.58 g. (0.020 mole) of phenyl N-n-propylcarbamate react in accordance with the procedure described in Example I, the product obtained is N-(2,4-dimethylbenzenesulfonyl)-N'-n-propylurea, M.P. 190–190.5 C. In the same manner, corresponding molar amounts of the monosodium salt of 2,5-dimethylbenzenesulfonamide and phenyl N-n-butylthiolcarbamate react to afford N-(2,5-dimethylbenzenesulfonyl)-N'-n-butylurea, M.P. 190.2–191° C. Similarly, the monosodium salt of 3,4-dichlorobenzenesulfonamide and phenyl N-n-propylcarbamate react to afford N-(3,4-dichlorobenzenesulfonyl)-N'-n-propylurea, M.P. 145.5–146° C. When the monosodium salt of 3-chloro-p-toluenesulfonamide and phenyl N-n-butylthiolcarbamate react in the above manner, the product obtained is N-(3-chloro-p-toluenesulfonyl)-N'-n - butylurea, M.P. 147–148° C.

Example IX

The procedure described in Example I was followed except that the monosodium salt of 2-thiophenesulfonamide and phenyl N-n-propylcarbamate are the reactants and the product is N-(2-thiophenesulfonyl)-N'-n-propylurea, M.P. 145–146.5° C. In the same manner, the monosodium salt of 5-chloro-2-thiophenesulfonamide and phenyl N-n-butylthiolcarbamate react to afford N-(5-chloro-2-thiophenesulfonyl)-N'-n-butylurea; the monosodium salt of 5-bromo-2-thiophenesulfonamide and phenyl N-n- amylcarbamate react to afford N-(5-bromo-2-thiophenesulfonyl)-N'-n-amylurea; the monosodium salt of 5-methyl-2-thiophenesulfonamide and phenyl N-n-hexylthiolcarbamate react to afford N-(5-methyl-2-thiophenesulfonyl)-N'-n-hexylurea; the monosodium salt of 4-methyl-2-thiophenesulfonamide and phenyl N-phenylcarbamate react to afford N-(4-methyl-2-thiophenesulfonyl)-N'-phenylurea; the monosodium salt of 5-t-butyl-2-thiophenesulfonamide and phenyl N-p-chlorophenylthiolcarbamate react to afford N-(5-t-butyl-2-thiophenesulfonyl)-N'-p-chlorophenylurea; the monosodium salt of 2,5-dimethyl-3-thiophenesulfonamide and phenyl N-t-butylcarbamate react to afford N-(2,5-dimethyl-3-thiophenesulfonyl)-N'-t-butylurea; the monosodium salt of 2,5-dichloro-3-thiophenesulfonamide and phenyl N-allylcarbamate react to afford N-(2,5-dichloro-3-thiophenesulfonyl)-N'-allylurea; the monosodium salt of 5-chloro-2-methyl-3-thiophenesulfonamide and phenyl N-cyclobutylcarbamate react to afford N-(5-chloro-2-methyl-3-thiophenesulfonyl)-N'-cyclobutylurea; the monosodium salt of 2-pyridinesulfonamide and phenyl N-cyclopropylmethylcarbamate react to afford N-(2-pyridinesulfonyl)-N'-cyclopropylmethylurea; the monosodium salt of 6-methyl-2-pyridinesulfonamide and phenyl N-ethylthiolcarbamate react to afford N-(6-methyl-2-pyridinesulfonyl)-N'-ethylurea; the monosodium salt of 4,6-dimethyl-2-pyridinesulfonamide and phenyl N-n-propylcarbamate react to afford N-(4,6-dimethyl-2-pyridinesulfonyl)-N'-n-propylurea; and the monosodium salt of 6-amino-3-pyridinesulfonamide and phenyl N-n-butylthiolcarbamate react to afford N-(6-amino-3-pyridinesulfonyl)-N'-n-butylurea.

*Example X*

The procedure described in Example I is followed except that the monopotassium salt of p-chlorobenzenesulfonamide is employed in place of the corresponding monosodium salt. Thus, when the monopotassium salt of p-chlorobenzenesulfonamide and phenyl N-n-propylcarbamate react in accordance with this procedure, the product obtained is N-(p-chlorobenzenesulfonyl)-N'-n-propylurea. In the same manner, the monolithium salt of p-chlorobenzenesulfonamide and phenyl N-n-propylcarbamate react to afford the identical product.

When the calcium salt of p-chlorobenzenesulfonamide and phenyl N-n-propylthiolcarbamate react in accordance with the above procedure, the product obtained is N-(p-chlorobenzenesulfonyl)-N'-n-propylurea. In the same manner, the strontium salt of p-chlorobenzenesulfonamide and the barium salt of p-chlorobenzenesulfonamide each react with phenyl N-n-propylcarbamate to afford N-(p-chlorobenzenesulfonyl)-N'-n-propylurea.

*Example XI*

The procedure described in the foregoing examples is followed except that the reaction is conducted in the presence of other inert polar organic solvents, such as diethylformamide, dimethylacetamide, diethylacetamide, diethyl sulfoxide, di-isopropyl sulfoxide, di-n-propyl sulfoxide, dimethyl sulfone, diethyl sulfone, di-isopropyl sulfone and di-n-propyl sulfone; in every case, the results obtained are substantially the same.

What is claimed is:

1. The process which comprises reacting a compound selected from the group consisting of monoalkali metal and alkaline earth metal salts of an arylsulfonamide having the formula $RSO_2NH_2$, wherein R is an aryl moiety selected from the group consisting of unsubstituted and substituted phenyl, thienyl and pyridyl radicals, said substituted radicals having substituents chosen from the group consisting of halogen, nitro, amino, acetylamino, lower alkyl and lower alkoxyl, in an inert polar organic solvent selected from the class consisting of N,N-lower dialkyl derivatives of lower alkane hydrocarbon carboxamides, lower dialkyl sulfoxides and lower dialkyl sulfones with an aryl N-substituted carbamate having the formula R'NHCOXR", wherein X is a member of the group consisting of oxygen and sulfur, R' is a member of the group consisting of phenyl, p-chlorophenyl, p-bromophenyl, p-tolyl, p-anisyl, alkyl having from one to ten carbon atoms, alkenyl having from three to eight carbon atoms, cycloalkyl having from three to six carbon atoms and cycloalkylalkyl having from four to nine carbon atoms, and R" is a member of the group consisting of phenyl, p-chlorophenyl, p-bromophenyl, p-nitrophenyl, p-tolyl, p-anisyl, α-naphthyl and β-naphthyl, said process being conducted at a temperature that is in the range of from about 20° C. to about 150° C. for about one-half to about ten hours.

2. The process as claimed in claim 1 wherein the molar ratio of arylsulfonamide salt to carbamate is in the range of from about 1:1 to about 1:3.

3. The process as claimed in claim 1 wherein the inert polar organic solvent is dimethylformamide.

4. The process as claimed in claim 1 wherein the inert polar organic solvent is dimethylacetamide.

5. The process as claimed in claim 1 wherein the inert polar organic solvent is dimethyl sulfoxide.

References Cited in the file of this patent

UNITED STATES PATENTS

| 2,907,692 | Haack et al. | Oct. 6, 1959 |

FOREIGN PATENTS

| 919,463 | France | Nov. 25, 1946 |
| 604,259 | Great Britain | June 30, 1948 |
| 794,552 | Great Britain | May 7, 1958 |

OTHER REFERENCES

Finger et al.: J. Am. Chem. Soc., vol. 78, pages 6034–6037 (1956).